US008925073B2

(12) United States Patent
Delia et al.

(10) Patent No.: US 8,925,073 B2
(45) Date of Patent: Dec. 30, 2014

(54) METHOD AND SYSTEM FOR PREVENTING PASSWORD THEFT THROUGH UNAUTHORIZED KEYLOGGING

(75) Inventors: Wayne M. Delia, Poughkeepsie, NY (US); Edward E. Kelley, Wappingers Falls, NY (US); Franco Motika, Hopewell Junction, NY (US)

(73) Assignee: International Business Machines Corporation, Armonk, NY (US)

( * ) Notice: Subject to any disclaimer, the term of this patent is extended or adjusted under 35 U.S.C. 154(b) by 1055 days.

(21) Appl. No.: 11/750,517

(22) Filed: May 18, 2007

(65) Prior Publication Data

US 2008/0289035 A1 Nov. 20, 2008

(51) Int. Cl.
G06F 21/00 (2013.01)
G06F 21/31 (2013.01)
G06F 21/83 (2013.01)

(52) U.S. Cl.
CPC .............. *G06F 21/31* (2013.01); *G06F 21/83* (2013.01); *G06F 2221/2127* (2013.01)
USPC ............................................. 726/22; 726/20

(58) Field of Classification Search
USPC ................... 726/4, 7, 26, 34, 20, 22; 713/184
See application file for complete search history.

(56) References Cited

U.S. PATENT DOCUMENTS

| 6,971,016 | B1 * | 11/2005 | Barnett | 713/182 |
| 7,251,621 | B1 | 7/2007 | Weng et al. | |
| 7,296,233 | B2 * | 11/2007 | Tan et al. | 715/741 |
| 7,596,701 | B2 * | 9/2009 | Varghese et al. | 713/182 |
| 7,607,023 | B2 | 10/2009 | Nakamura et al. | |
| 7,664,960 | B1 * | 2/2010 | Clubb | 713/184 |
| 8,006,300 | B2 * | 8/2011 | Mizrah | 726/20 |
| 8,180,051 | B1 | 5/2012 | O'Toole, Jr. | |
| 8,230,482 | B2 * | 7/2012 | Peterson et al. | 726/2 |
| 8,712,049 | B2 | 4/2014 | Delia et al. | |
| 8,712,050 | B2 | 4/2014 | Delia et al. | |
| 2002/0097876 | A1 | 7/2002 | Harrison | |

(Continued)

FOREIGN PATENT DOCUMENTS

| EP | 1447734 A2 | 8/2004 |
| EP | 1770575 A1 | 4/2007 |
| JP | 2004280245 A | 10/2004 |
| WO | 2006033531 A1 | 3/2006 |

OTHER PUBLICATIONS

P. Kitsos et al., "Hardware Implementation of the RC4 Stream Cipher," IEEE, pp. 1-4, 2004.

(Continued)

Primary Examiner — Brandon Hoffman
Assistant Examiner — Thong Truong
(74) Attorney, Agent, or Firm — Canotr Colburn LLP

(57) ABSTRACT

A method for preventing password theft through unauthorized keylogging includes detecting, from a host application, a request for a password input by a user of an input keyboard device; activating a randomly generated keyboard map uniquely associated with the host application such that a first set of keystroke values inputted by the user results in a second, converted set of keystroke values transmitted to the host application, in accordance with the randomly generated keyboard map uniquely associated therewith; and upon completion of a password entry process by the user, deactivating the randomly generated keyboard map such that subsequent keystroke values inputted by the user are no longer converted to the values according to the keyboard map.

14 Claims, 3 Drawing Sheets

(56) References Cited

U.S. PATENT DOCUMENTS

| | | |
|---|---|---|
| 2002/0126841 A1 | 9/2002 | Arai |
| 2003/0131266 A1* | 7/2003 | Best et al. .................... 713/202 |
| 2004/0080529 A1 | 4/2004 | Wojcik |
| 2004/0117632 A1 | 6/2004 | Arling et al. |
| 2005/0071282 A1 | 3/2005 | Lu et al. |
| 2006/0101128 A1* | 5/2006 | Waterson .................... 709/212 |
| 2006/0174119 A1 | 8/2006 | Xu |
| 2007/0073888 A1 | 3/2007 | Madhok |
| 2007/0077916 A1 | 4/2007 | Saito |
| 2007/0089164 A1 | 4/2007 | Gao et al. |
| 2007/0130347 A1 | 6/2007 | Rangan et al. |
| 2007/0157298 A1 | 7/2007 | Dingwall et al. |
| 2007/0174628 A1 | 7/2007 | Charrette et al. |
| 2008/0025307 A1 | 1/2008 | Preiss et al. |
| 2008/0098464 A1 | 4/2008 | Mizrah |
| 2008/0184036 A1* | 7/2008 | Kavsan ........................ 713/184 |
| 2008/0209528 A1 | 8/2008 | Francis et al. |
| 2009/0066543 A1 | 3/2009 | Delia et al. |
| 2009/0070595 A1 | 3/2009 | Delia et al. |
| 2009/0125993 A1 | 5/2009 | Delia et al. |
| 2010/0023750 A1 | 1/2010 | Tan |

OTHER PUBLICATIONS

Kelly R. Norman, "Encryption of Computer Peripheral Devices," School of Technology Brigham Young University, pp. 1-117, Apr. 2006.

QFX Products; Retrieved from the Internet : <http://www.qfxsoftware.com/products.htm>; Jun. 7, 2007.

PCT Search Report PCT/EP2008055554 Mailed Aug. 18, 2008.

cell phone digest, "Protect Your Cell Phone From Hackers via MyMobiSafe," 27 Aug. 2007, pp. 1-4. <http://www.cellphonedigest.net/news/2007/08/protect_your_cell_phonefrom_h.php>.

Final Office Action for related U.S. Appl. No. 11/938,487, dated May 20, 2008, pp. 1-14.

Final Office Action for related U.S. Appl. No. 11/853,263, dated Dec. 21, 2010, pp. 1-16.

Final Office Action for related U.S. Appl. No. 11/853,267, dated Dec. 21, 2010, pp. 1-16.

Final Office Action for related U.S. Appl. No. 11/938,487, dated Dec. 26, 2008, pp. 1-9.

Non-Final Office Action for related U.S. Appl. No. 11/853,263, dated Jul. 21, 2010, pp. 1-16.

Non-Final Office Action for related U.S. Appl. No. 11/853,263, dated Jul. 16, 2013, pp. 1-13.

Non-Final Office Action for related U.S. Appl. No. 11/853,267, dated Jul. 9, 2010, pp. 1-14.

Non-Final Office Action for related U.S. Appl. No. 11/853,267, dated Jul. 16, 2013, pp. 1-13.

Notice of Allowance and Fee(s) Due for related U.S. Appl. No. 11/853,263, dated Dec. 13, 2013, pp. 1-13.

Notice of Allowance and Fee(s) Due for related U.S. Appl. No. 11/853,267, dated Dec. 13, 2013, pp. 1-13.

Office Action Summary for Applications Under Accelerated Examination for related U.S. Appl. No. 11/938,487, dated Mar. 3, 2008, pp. 1-9.

Office Action Summary for Applications Under Accelerated Examination for related U.S. Appl. No. 11/938,487, dated Sep. 8, 2008, pp. 1-10.

* cited by examiner

Password prompting URL 1 ⟶ Random Keyboard Map 1

Password prompting URL 2 ⟶ Random Keyboard Map 2

Password prompting URL 3 ⟶ Random Keyboard Map 3

⋮

Password prompting URL n ⟶ Random Keyboard Map n

Fig. 3

Password prompting URL 1 ⟶ Random Keyboard Seed 1

Password prompting URL 2 ⟶ Random Keyboard Seed 2

Password prompting URL 3 ⟶ Random Keyboard Seed 3

⋮

Password prompting URL n ⟶ Random Keyboard Seed n

Fig. 4

METHOD AND SYSTEM FOR PREVENTING PASSWORD THEFT THROUGH UNAUTHORIZED KEYLOGGING

BACKGROUND

The present invention relates generally to computer network security and, more particularly, to a method and system for preventing password theft through unauthorized keylogging.

Keylogging is a technological process of monitoring computer activity by recording, transmitting, and examining the characters typed on a computer keyboard. This technique is sometimes used by employers monitoring employee productivity, typically involving clerical tasks. Other, more nefarious implementations of keylogging programs involve espionage, such as those embodied in spyware programs. These programs attempt to gather confidential information, such as a text string including an account name and password, and particularly a text string of keyboard strokes following input of a particular web site address. For example, a mouse click on a web browser icon displays the configured home page. A keyboard is used to enter a secure banking web site URL in the address input box. Following that, an account number and password are keyed in to the respective input fields. The keystrokes entered on the keyboard are recorded by a malicious spyware program, and that sequence of keystrokes is sent to an unknown third party for possible fraudulent use.

Keylogging programs, once installed and activated on a computer system, are extremely difficult to detect. Commercial and freeware spyware detection programs are available, but they are only useful against identified threats listed in the anti-spyware definitions file. However, new and more recent variations of spyware keylogger programs may not be identified by standard anti-spyware detection programs.

Keylogging programs generally work on the principle of detecting basic input/output system (BIOS) signals sent from what is assumed to be a standard keyboard layout (e.g., "QWERTY", "DVORAK", or other standard international keyboard layouts). Windows Vista and other popular operating systems and application software enable "re-mapping" of a computer keyboard. While this technique will thwart keyloggers, it is largely unused by the majority of computer users because the remapped keyboard departs from what is traditionally coordinated with the "muscle memory" of touch typists familiar with standard keyboard layouts. Other solutions to thwart keylogging involve displaying a keyboard on a monitor, from which input letters are selected with the mouse to enter the alphabetic and numeric characters in the input fields into the web form area which is used to contain the password. A variation of this method is to copy and paste the confidential information from a file. However, such approaches carry the risk of being defeated by hackers through the use of capturing and transmitting screen shots of completed forms, which are then analyzed for the confidential information.

Accordingly, it would be desirable to be able to provide an improved method and system for preventing password theft through unauthorized keylogging.

SUMMARY

The foregoing discussed drawbacks and deficiencies of the prior art are overcome or alleviated by a method for preventing password theft through unauthorized keylogging. In an exemplary embodiment, the method includes detecting, from a host application, a request for a password input by a user of an input keyboard device; activating a randomly generated keyboard map uniquely associated with the host application such that a first set of keystroke values inputted by the user results in a second, converted set of keystroke values transmitted to the host application, in accordance with the randomly generated keyboard map uniquely associated therewith; and upon completion of a password entry process by the user, deactivating the randomly generated keyboard map such that subsequent keystroke values inputted by the user are no longer converted to the values according to the keyboard map.

In another embodiment, a system for preventing password theft through unauthorized keylogging includes a computing network configured for establishing communication between a user and a host application, and a keyboard mapping program executable by a computing device operated by the user. The keyboard mapping program is further configured to detect, from the host application, a request for a password input by the user; activate a randomly generated keyboard map uniquely associated with the host application such that a first set of keystroke values inputted by the user on an input keyboard device results in a second, converted set of keystroke values transmitted to the host application, in accordance with the randomly generated keyboard map uniquely associated therewith; and upon completion of a password entry process by the user, deactivate the randomly generated keyboard map such that subsequent keystroke values inputted by the user are no longer converted to the values according to the keyboard map.

In still another embodiment, a computer program product includes a computer readable computer program code for preventing password theft through unauthorized keylogging, and instructions for causing a computer to implement a method. The method further includes detecting, from a host application, a request for a password input by a user of an input keyboard device; activating a randomly generated keyboard map uniquely associated with the host application such that a first set of keystroke values inputted by the user results in a second, converted set of keystroke values transmitted to the host application, in accordance with the randomly generated keyboard map uniquely associated therewith; and upon completion of a password entry process by the user, deactivating the randomly generated keyboard map such that subsequent keystroke values inputted by the user are no longer converted to the values according to the keyboard map.

BRIEF DESCRIPTION OF THE DRAWINGS

Referring to the exemplary drawings wherein like elements are numbered alike in the several Figures:

FIG. 3 represents an exemplary memory mapping of various password-prompting URLs with a corresponding, randomly generated keyboard map for the URL; and FIG. 4 represents an exemplary memory mapping of various password-prompting URLs with a corresponding seed used to randomly generate a unique keyboard map for the URL.

DETAILED DESCRIPTION

Disclosed herein is method and system for preventing password theft through unauthorized keylogging. Briefly stated, the embodiments herein generate a new keyboard mapping whenever a new password is to be entered for an on-line application. This mapping will be randomly constructed so that random values are associated with each of the keys. When the user wants to re-access the application at a later point in time by entering the previously established password, the corresponding mapped keyboard for that site will be engaged and used to enter the password. Each individual password will be constructed with a unique randomly constructed keyboard, with names/identities of the random keyboards corresponding to the URL names where the passwords are to be entered. In this way, the correct random keyboard will be used whenever a password is to be entered. Once the password has been entered, the keyboard will revert back to the standard (e.g., QWERTY) keyboard.

In addition to preventing hackers from stealing passwords through keylogging methods, the invention embodiments described herein also provide an additional advantage due to the random keyboard generation process being transparent to the user. In other words, since each separate application (e.g., website) will have a unique randomly generated keyboard map associated therewith, a user can use a single password for every application. In reality, the actual password for each different application will be different, and unknown to the user. However, so long as the user is on a machine with the capability of invoking the correct keyboard map for a particular site, the user need not know the true password, since the keyboard mapping program will generate the correct password, provided the user correctly types the sequence of keys that were originally entered when initially selecting the password.

Figure 1:
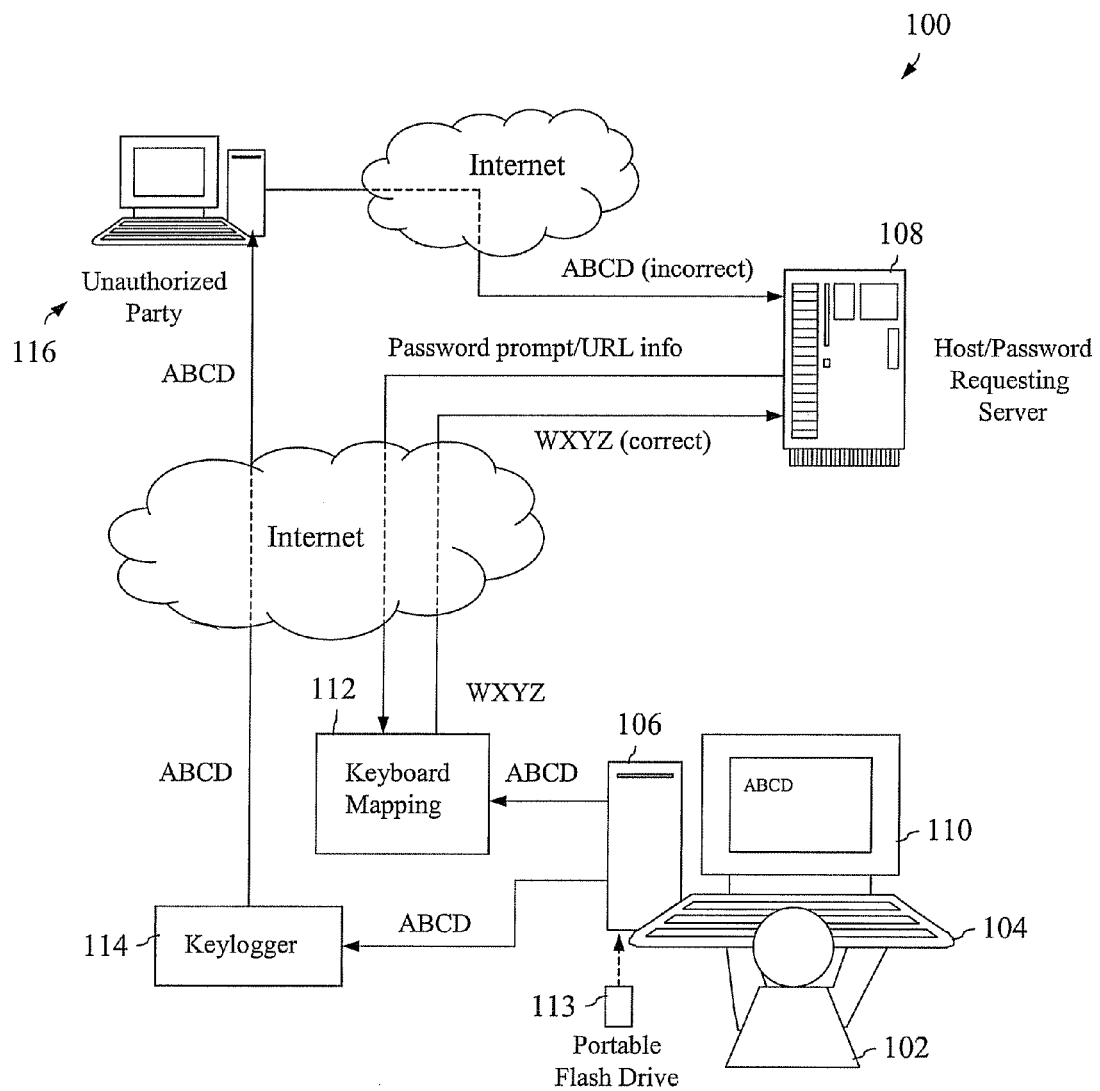
FIG. 1 is a schematic diagram of an exemplary computer networking system, suitable for use in accordance with an embodiment of the invention.

Referring initially to FIG. 1, there is shown a schematic diagram of an exemplary computer networking system 100, suitable for use in accordance with an embodiment of the invention. In the exemplary system 100 shown, a user 102 enters either a new or existing password using a keyboard 104 of a computing device 106, at the prompting of an application, such as a web page located on a server 108. From the perspective of the user 102, the password the user has chosen for the particular application provided on server 108 is "ABCD", as reflected on the user's display 110.

However, as also illustrated in FIG. 1, a keyboard mapping program/application 112 (e.g., installed on the user's computer 106 and/or a portable memory device such as a flash drive 113) converts the set of password keystrokes (ABCD) input by the user in accordance with a randomly generated mapping for the keyboard. The randomly generated map is associated with, for example, the URL of the password-requesting application. Accordingly, each time the user is prompted to enter a password on that site, the same keyboard map is used to convert keystrokes.

In the example depicted in FIG. 1, the particular keyboard map associated with the password-requesting application converts keystrokes "ABCD" on keyboard 104 to the character sequence "WXYZ" upon detection that the user is being prompted for a password (new or existing) by the host application. It is this set of characters that is actually transmitted (e.g., over the Internet or other type of communication network) to the password-requesting server 108 and, therefore, the true password from the perspective of the application is WXYZ. As explained in additional detail below, the functionality of the actual keyboard mapping translation is only in effect during entry of password characters, in an exemplary embodiment. Thus, if the user is entering other types of non-password data (e.g., address information, order information for a commercial website, etc.), the keyboard mapping application recognizes this and allows the true keyboard character information to be transmitted over the network.

As further depicted in FIG. 1, in the event a keylogger program 114 is (maliciously or otherwise) installed on the user's computer 106, the keylogger program will record only the actual keystrokes (ABCD) entered by the user 102, and not the converted key sequence (WXYZ) generated by the keyboard mapping program 112. Therefore, even if an unauthorized party 116 is able to access the logged keystrokes from the user's computer keyboard 104, the intercepted password will not allow the third party to independently access the user's protected account on the server 108, since ABCD is not the true password from the perspective of the server 108.

As indicated above, in addition to defeating actual password theft, the keyboard mapping program 112 also allows a user to have a single password for several accounts/applications/website. From a security perspective, consumers are generally discouraged from using the same password for several applications since the compromise of a single password can leave the user vulnerable to unauthorized access of multiple accounts. However, in the present disclosure, the same password can be entered by a user for multiple applications. Because distinct hosts having distinct URLs will have a unique keyboard mapping scheme associated therewith, the same password typed by a user will result in different passwords sent to different applications.

For example, if the application of server 108 were the user's bank account, the mapping scheme that converted "ABCD" to "WXYZ" is only associated with the URL of that site. If the user 102 were to then navigate to a second website (such as a 401k account or an on-line shopping website), the keyboard mapping program 112 would generate a new mapping scheme or access a previous mapping scheme created for that second website. Therefore, even if the user enters the same password ABCD on the keyboard 104, the result will be a different set of characters transmitted to the second website (e.g., "J8RP").

Figure 2:
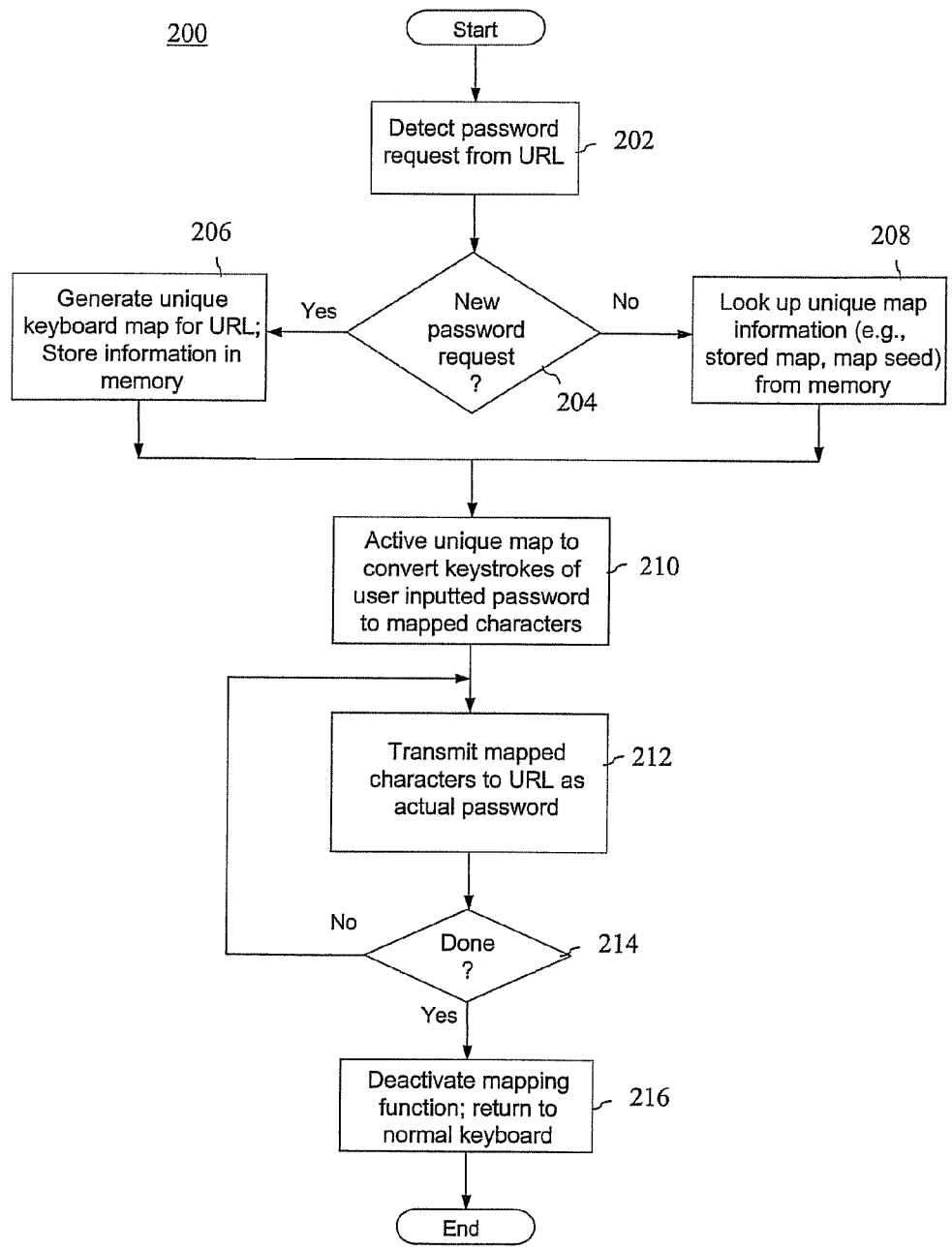
FIG. 2 is a flow diagram illustrating a method for preventing password theft through unauthorized keylogging, in accordance with an embodiment of the invention.

Referring to FIG. 2, there is shown a flow diagram illustrating a method 200 for preventing password theft through unauthorized keylogging, in accordance with an embodiment of the invention. As shown in block 202, a password request/prompt is detected from an application (e.g., website corresponding to a specific URL). At decision block 204, it is determined whether the password request is a new request. If a user is establishing a new password, then the method proceeds to block 206 where a unique random keyboard mapping is generated for the user's keyboard, to be applied as the user types in the new password.

Once initially generated, the unique keyboard mapping is associated with the URL that prompted the creation of the password. In one embodiment, the method 200 may automatically generate, register and store the keyboard mapping with the URL or, alternatively, the method may permit the user to invoke the mapping through a pull-down menu, for example. The mapping information (i.e., the keyboard map/host application association) may be stored on the user's computer and/or portable memory device such a flash drive so that the user can apply the associated keyboard mapping for password entry from any number of different computing devices and locations.

In one embodiment, the generated keyboard map may itself be stored in memory and associated with its specific URL, such as shown in FIG. 3. Alternatively, instead of storing the keyboard map itself, a seed used to generate the unique keyboard map could be stored in memory, as shown in FIG. 4. The seed may be, for example, any number or vector that may be used to initialize pseudorandom number generation, such as the time or other state of the computer system. Accordingly, by accessing a unique seed associated with a specific website, the random keyboard mapping that was originally generated for password creation may be recreated when the password is to be re-entered by the user upon a subsequent log in.

Referring once again to FIG. 2, if at decision block 204, it is determined that the password request is not a new request, then the method proceeds to block 208 where the unique keyboard map information for the particular requesting URL is looked up (e.g., a stored keyboard map or map seed) from memory. Regardless of whether the prompted password is new or previously established, the method then proceed to block 210 where the unique keyboard map is activated for the user to type in the password in the appropriate field of the computing device used. When activated for password entry, the keys struck by the user are converted to the mapped values and transmitted to the URL as the actual inputted password, as reflected in block 212. Decision block 214 checks to see whether the user has completed entry of the requested password. Once the password is successfully entered, and the user gains the appropriate access to the application/website, the method proceeds to block 216, where the mapping function is deactivated and "normal" keyboard functionality is established.

In view of the above, the present method embodiments may therefore take the form of computer or controller implemented processes and apparatuses for practicing those processes. The disclosure can also be embodied in the form of computer program code containing instructions embodied in tangible media, such as floppy diskettes, CD-ROMs, hard drives, or any other computer-readable storage medium, wherein, when the computer program code is loaded into and executed by a computer or controller, the computer becomes an apparatus for practicing the invention.

While the invention has been described with reference to a preferred embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method for preventing password theft through unauthorized keylogging, the method comprising:
   detecting, from a host application, a request for a password input by a user of an input keyboard device;
   determining whether the request for password input represents a new password for the host application;
   in the event that the request for password input represents a new password for the host application, generating a randomly generated keyboard map and uniquely associating it with the host application;
   activating, prior to entry of any password related keystrokes by the user, the randomly generated keyboard map uniquely associated with the host application such that a first set of keystroke values inputted by the user results in a second, converted set of keystroke values transmitted to the host application, in accordance with the randomly generated keyboard map uniquely associated therewith, and wherein the activating the randomly generated keyboard map is implemented independent of a mouse cursor position prior to entry of any password related keystrokes;
   storing the randomly generated keyboard map uniquely associated with the host application on a portable flash drive;
   in the event that the request for password input does not represent a new password for the host application, accessing the randomly generated keyboard map through a stored association with the host application, wherein the stored association with the host application comprises a seed used in the initial generation of the keyboard map; and
   upon completion of a password entry process by the user, deactivating the randomly generated keyboard map such that subsequent keystroke values inputted by the user are no longer converted to the values according to the keyboard map.

2. The method of claim 1, wherein the randomly generated keyboard map is associated with the host application by a Uniform Resource Locator (URL).

3. The method of claim 1, wherein the stored association with the host application comprises the keyboard map itself.

4. The method for claim 1, wherein, for a single common password input by a user for a plurality of different applications, different passwords are transmitted to each of the different applications.

5. The method of claim 1, further comprising storing a copy of the keyboard map/host application association on a portable storage device.

6. A system for preventing password theft through unauthorized keylogging, comprising:
   a computing network configured for establishing communication between a user and a host application; and
   a keyboard mapping program executable by a computing device operated by the user, the keyboard mapping program further configured to:
      detect, from the host application, a request for a password input by the user;
      determine whether the request for password input represents a new password for the host application;
      in the event that the request for password input represents a new password for the host application, generate a randomly generated keyboard map and uniquely associate it with the host application;
      activate, prior to entry of any password related keystrokes by the user, the randomly generated keyboard map that is uniquely associated with the host application such that a first set of keystroke values inputted by the user on an input keyboard device results in a second, converted set of keystroke values transmitted to the host application, in accordance with the randomly generated keyboard map uniquely associated therewith, and wherein the activation of the randomly generated keyboard map is implemented independent of a mouse cursor position prior to entry of any password related keystrokes;
      store the randomly generated keyboard map uniquely associated with the host application on a portable flash drive;
      in the event that the request for password input does not represent a new password for the host application, access the randomly generated keyboard map through a stored association with the host application, wherein the stored association with the host application comprises a seed used in the initial generation of the keyboard map; and upon completion of a password entry process by the user, deactivate the randomly generated keyboard map such that subsequent keystroke values inputted by the user are no longer converted to the values according to the keyboard map.

7. The system of claim 6, wherein the keyboard mapping program is further configured to:
in the event that the request for password input does not represent a new password for the host application, access the randomly generated keyboard map through a stored association with the host application.

8. The system of claim 7, wherein the randomly generated keyboard map is associated with the host application by a Uniform Resource Locator (URL).

9. The system of claim 7, wherein the stored association with the host application comprises the keyboard map itself.

10. The system for claim 6, wherein, for a single common password input by a user for a plurality of different applications, different passwords are transmitted to each of the different applications.

11. A computer program product comprising:
a non-transitory, tangible computer readable medium having computer readable computer program code stored thereon that, when executed by a computer, implements a method for preventing password theft through unauthorized keylogging, the method comprising:
detecting, from a host application, a request for a password input by a user of an input keyboard device;
determining whether the request for password input represents a new password for the host application;
in the event that the request for password input represents a new password for the host application, generating a randomly generated keyboard map and uniquely associating it with the host application;
activating, prior to entry of any password related keystrokes by the user, the randomly generated keyboard map that is uniquely associated with the host application such that a first set of keystroke values inputted by the user results in a second, converted set of keystroke values transmitted to the host application, in accordance with the randomly generated keyboard map uniquely associated therewith, and wherein the activating the randomly generated keyboard map is implemented independent of a mouse cursor position prior to entry of any password related keystrokes;
storing the randomly generated keyboard map uniquely associated with the host application on a portable flash drive;
in the event that the request for password input does not represent a new password for the host application, accessing the randomly generated keyboard map through a stored association with the host application, wherein the stored association with the host application comprises a seed used in the initial generation of the keyboard map; and
upon completion of a password entry process by the user, deactivating the randomly generated keyboard map such that subsequent keystroke values inputted by the user are no longer converted to the values according to the keyboard map.

12. The computer program product of claim 11, wherein the randomly generated keyboard map is associated with the host application by a Uniform Resource Locator (URL).

13. The computer program product of claim 11, wherein the stored association with the host application comprises the keyboard map itself.

14. The computer program product for claim 11, wherein, for a single common password input by a user for a plurality of different applications, different passwords are transmitted to each of the different applications.

* * * * *